United States Patent
Wonderlich et al.

(10) Patent No.: US 11,944,046 B2
(45) Date of Patent: Apr. 2, 2024

(54) SENSING AND CONTROL OF LIQUID APPLICATION USING AN AGRICULTURAL MACHINE

(71) Applicant: Deere & Company, Moline, IL (US)

(72) Inventors: Grant J. Wonderlich, Milan, IL (US); Kenneth Herrmann, Port Byron, IL (US); Michael C. Steele, Orion, IL (US); Kilian Wolff, Kaiserslautern (DE); Gerrit Pruessmann, Kaiserslautern (DE)

(73) Assignee: Deere & Company, Moline, IL (US)

( * ) Notice: Subject to any disclaimer, the term of this patent is extended or adjusted under 35 U.S.C. 154(b) by 408 days.

(21) Appl. No.: 16/054,182

(22) Filed: Aug. 3, 2018

(65) Prior Publication Data

US 2020/0037519 A1 Feb. 6, 2020

(51) Int. Cl.
| | |
|---|---|
| *A01G 25/16* | (2006.01) |
| *B05B 1/08* | (2006.01) |
| *B05B 9/04* | (2006.01) |
| *B05B 9/06* | (2006.01) |
| *B05B 12/08* | (2006.01) |

(52) U.S. Cl.
CPC ............. *A01G 25/165* (2013.01); *B05B 1/08* (2013.01); *B05B 9/0423* (2013.01); *B05B 9/06* (2013.01); *B05B 12/085* (2013.01)

(58) Field of Classification Search
CPC ..... A01C 23/007; A01C 23/047; A01C 5/064; A01C 5/068; A01C 7/06; A01C 7/105; A01C 7/107; A01C 7/203; A01G 25/165; A01M 7/0042; A01M 7/0089; B05B 12/085; B05B 1/08; B05B 9/0423; B05B 9/00
See application file for complete search history.

(56) References Cited

U.S. PATENT DOCUMENTS

| | | | |
|---|---|---|---|
| 5,134,961 A | 8/1992 | Giles et al. | |
| 9,435,458 B2 | 9/2016 | Needham et al. | |
| 2009/0306830 A1* | 12/2009 | Cummings | ........ G05B 23/0283 700/282 |
| 2011/0100333 A1* | 5/2011 | Toyohara | ................ F02D 41/20 123/490 |

(Continued)

FOREIGN PATENT DOCUMENTS

| | | |
|---|---|---|
| DE | 102011053182 | 3/2013 |
| EP | 1154685 | 11/2001 |
| WO | 2018094382 | 5/2018 |

OTHER PUBLICATIONS

U.S. Appl. No. 16/055,341 Office Action dated Feb. 7, 2020, 11 pages,.

(Continued)

*Primary Examiner* — Yuhui R Pan
(74) *Attorney, Agent, or Firm* — Joseph R. Kelly; Kelly, Holt & Christenson PLLC

(57) ABSTRACT

An agricultural machine applies liquid material to a field. Valve control signals control valves to apply the liquid material. Row pressure on the agricultural machine is sensed to identify when the valve is opened to apply the liquid material. The valve control signals are generated, based on the row pressure, to control the valves to apply the liquid material at a desired location in the field, relative to plant locations in the field.

14 Claims, 10 Drawing Sheets

(56) References Cited

U.S. PATENT DOCUMENTS

| | | | |
|---|---|---|---|
| 2012/0215410 A1* | 8/2012 | McClure | A01B 79/005 701/50 |
| 2014/0277780 A1* | 9/2014 | Jensen | B05B 1/20 700/283 |
| 2014/0299673 A1* | 10/2014 | Grimm | B05B 9/0423 239/11 |
| 2015/0181819 A1* | 7/2015 | Celebi | A01G 27/001 701/2 |
| 2015/0351375 A1 | 12/2015 | Ni | |
| 2016/0175869 A1 | 6/2016 | Sullivan et al. | |
| 2016/0202679 A1* | 7/2016 | Bermudez Rodriguez | G05B 19/042 700/284 |
| 2018/0043384 A1 | 2/2018 | Grimm et al. | |
| 2019/0232304 A1* | 8/2019 | Grimm | A01C 7/06 |
| 2019/0258859 A1* | 8/2019 | Baynes | A01B 49/06 |
| 2020/0037598 A1 | 2/2020 | Wonderlich | |

OTHER PUBLICATIONS

U.S. Appl. No. 16/055,341 Office Action dated May 19, 2020, 12 pages.
European Search Report issued in European Patent Application No. 19189892.3 dated Dec. 9, 2019 (10 pages).
European Search Report issued in European Patent Application No. 19189888.1 dated Dec. 9, 2019 (10 pages).
U.S. Appl. No. 16/055,341 Ofice Action dated May 19, 2020, 12 pages.

* cited by examiner

SENSING AND CONTROL OF LIQUID APPLICATION USING AN AGRICULTURAL MACHINE

FIELD OF THE DESCRIPTION

The present description relates to agricultural machines. More specifically, the present description relates to controlling liquid application using an agricultural machine.

BACKGROUND

There is a wide variety of different types of agricultural machines. Some agricultural machines are used to apply a liquid substance to a field. These agricultural machines can include, for instance, planters that have row units, sprayers, tillage equipment with sidedress bars, air seeders, etc.

A row unit is often mounted on a planter with a plurality of other row units. The planter is often towed by a tractor over soil where seed is planted in the soil, using the row units. The row units on the planter follow the ground profile by using a combination of a downforce assembly that imparts a downforce on the row unit to push disc openers into the ground and gauge wheels to set depth of penetration of the disc openers.

Row units can also be used to apply liquid material to the field over which they are traveling. In some scenarios, each row unit has a pulse-controlled valve (such as a valve controlled using a pulse width modulated signal) that is coupled between a pump (that pumps liquid from a source of liquid material), and an application assembly. As the valve is pulsed, the valve is moved between an open position and a closed position so liquid passes through the valve, from the source to the application assembly, and is applied to the field. Other row units may have valves that need not be pulse controlled.

An agricultural sprayer often includes a tank or reservoir that holds a substance to be sprayed on an agricultural field. The sprayer includes a boom that is fitted with one or more nozzles that are used to spray the substance on the field. A pump pumps the substance from the reservoir, along the boom, to the nozzles. As the sprayer travels through the field, the boom is disposed in a deployed position and the substance is pumped from the tank or reservoir, through the nozzles, so that it is sprayed or applied to the field over which the sprayer is traveling. As with row units, the nozzles can have corresponding valves that are controlled by a pulsed control signal (such as a pulse width modulated signal). As the control signal pulses, the valve is moved between an opened position and a closed position. When in the open position, liquid passes through the valve, so that it can be applied to the field. Other sprayers may have valves that are not operated by a pulse control signal.

These are just two examples of agricultural machines that can be used to apply a liquid material to a field. Others can be used as well.

The discussion above is merely provided for general background information and is not intended to be used as an aid in determining the scope of the claimed subject matter.

SUMMARY

An agricultural machine applies liquid material to a field. Valve control signals control valves to apply the liquid material. Row pressure on the agricultural machine is sensed to identify when the valve is opened to apply the liquid material. The valve control signals are generated, based on the row pressure, to control the valves to apply the liquid material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description proceeds with respect to two different examples of agricultural machines that apply a liquid substance to a field. The first is a planter and the second is a sprayer. These are examples only, and it will be appreciated that the present discussion could just as easily apply to other agricultural machines.

Figure 1:
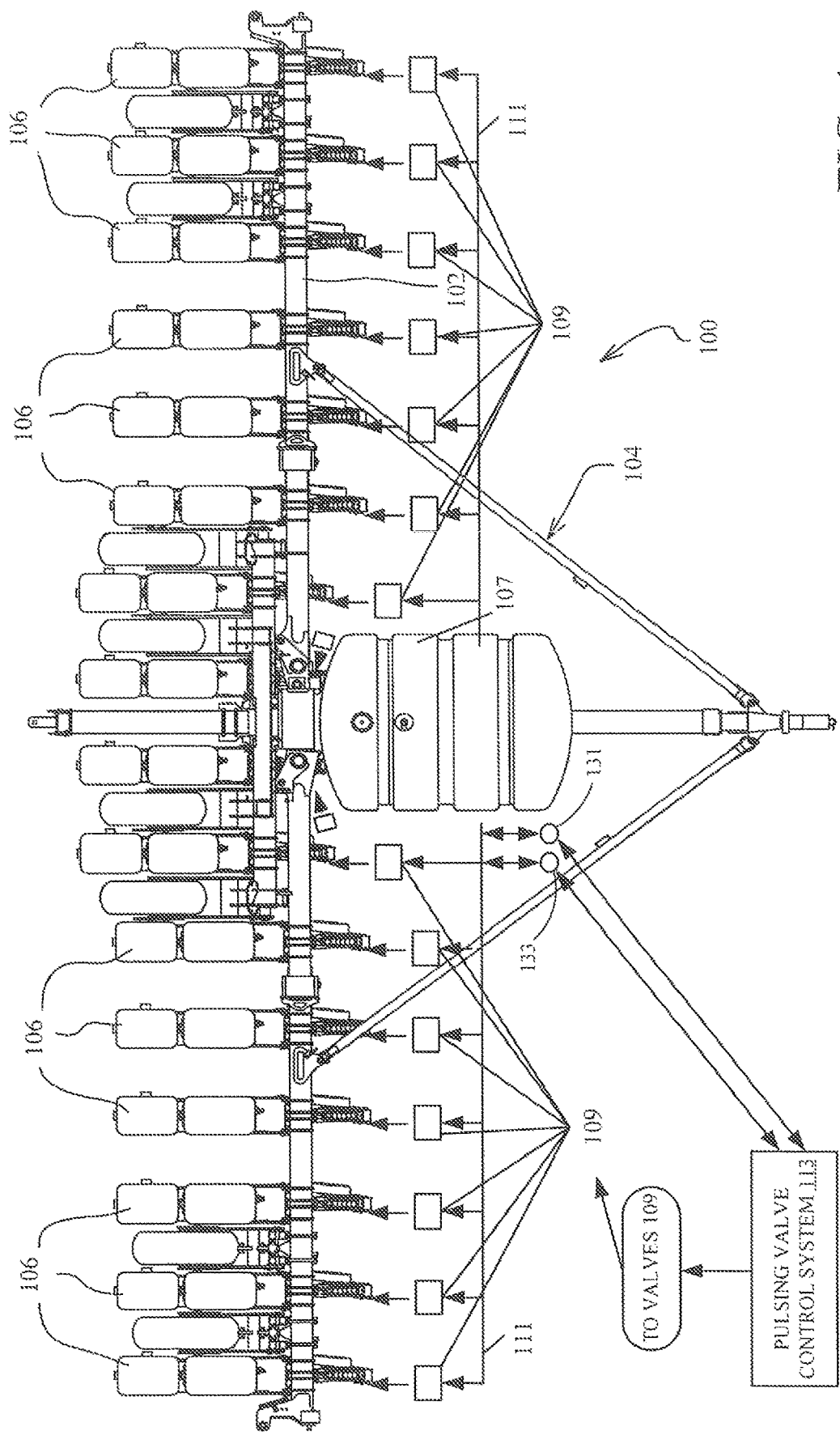
FIG. 1 is a top view of one example of a planting machine.

FIG. 1 is a top view of one example of an agricultural planting machine 100. Machine 100 is a row crop planting machine that illustratively includes a toolbar 102 that is part of a frame 104. FIG. 1 also shows that a plurality of planting row units 106 are mounted to the toolbar 102. Machine 100 can be towed behind another machine, such as a tractor. FIG. 1 shows that liquid material can be stored in a tank 107 and pumped to valves 109 through a supply line 111. In one example, a valve control system 113 controls valves 109. In one example, system 113 controls valves 109 using a pulse width modulated control signal, although they can be controlled with a non-pulsed control signal as well. When they are pulsed, the flow rate through valve 109 is based on the duty cycle of the control signal (which controls the amount of time the valves are open and closed). The valves 109 are connected to an application assembly that applies liquid to the field.

FIG. 1 also shows that in one example, planter 100 includes a flow meter 131 that senses flow of fluid from tank 107 through the supply line 111. Where planter 100 has a liquid return line that returns liquid to tank 107 from supply line 111, then it can also have a return flow meter 135 that senses the flow of liquid returned to tank 107. The difference between the flow sensed by flow meter 131 (exiting tank 107 into supply line 111) and the flow sensed by meter 135

(returning to tank 107 from supply line 111) is indicative of the flow of liquid applied through nozzles 109.

Planter 100 also illustratively includes a pressure sensor 133 that senses pressure in supply line 111. It can have multiple pressure sensors mounted to sense pressure at different locations along supply line 111 as well. Flow meter 131 illustratively generates a boom flow signal indicative of the fluid flow (such as mass flow rate) through supply line 111 and provides that signal to valve control system 113. Flow meter 135 generates a return flow signal and provides that signal to valve control system 113 as well. Pressure sensor 133 illustratively generates a supply line pressure signal indicative of the pressure in supply line 111, and provides that signal to valve control system 113. Where there are multiple pressure sensors along supply line 111, they each generate a different supply line pressure signal and supply it to system 113. As is discussed in greater detail below, those signals can be used to identify an operational characteristic of the valves 109 and/or corresponding application assemblies (such as whether they are clogged or partially clogged, the flow rate through them during operation, the duration of the pulses, flow volume, etc.). They can also be used in controlling certain portions of planter 110.

Figure 2:
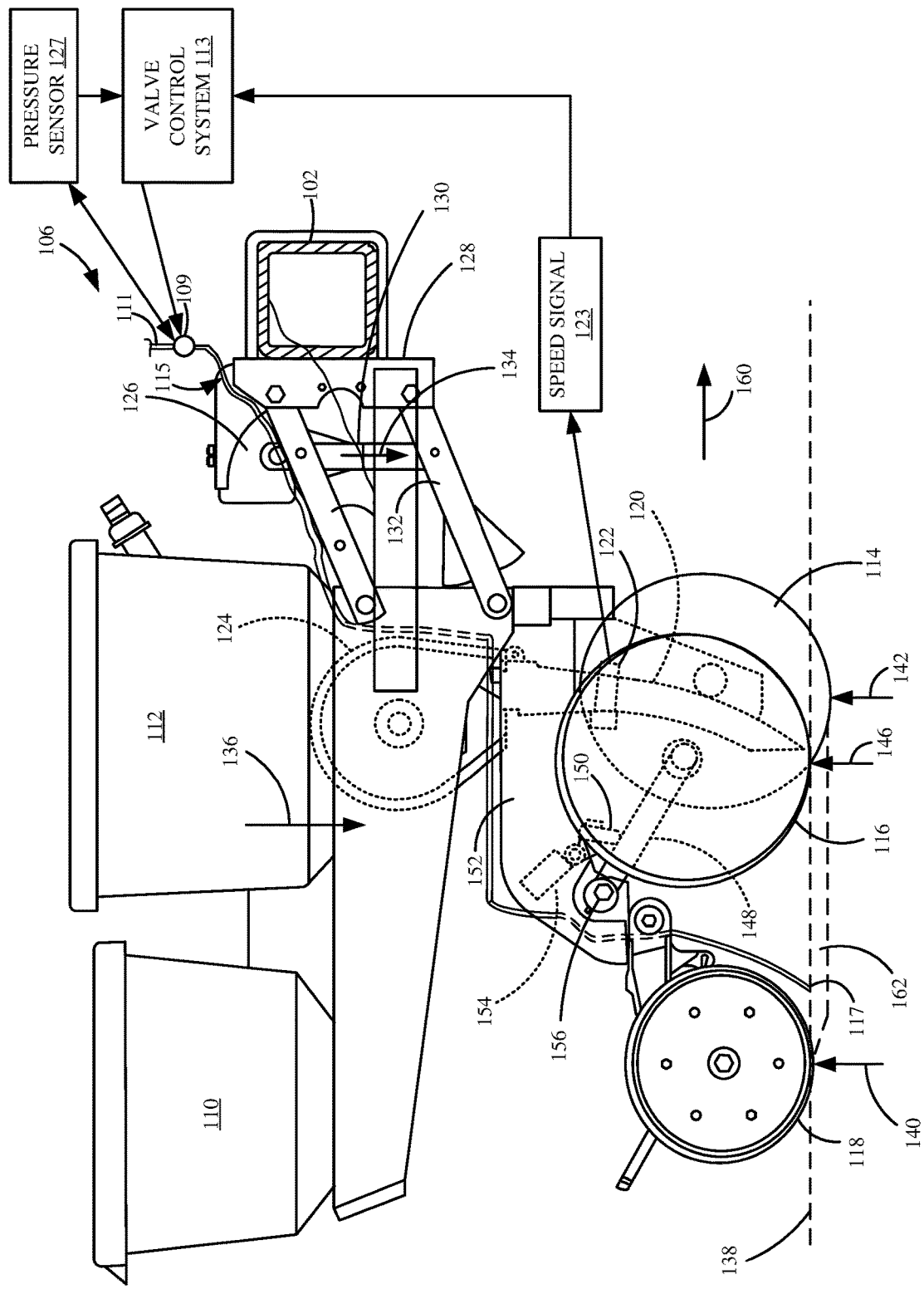
FIG. 2 shows a side view of one example of a row unit of the planting machine illustrated in FIG. 1.

FIG. 2 is a side view showing one example of a row unit 106, with valve 109 and system 113 shown as well, in more detail. Row unit 106 illustratively includes a chemical tank 110 and a seed storage tank 112. It also illustratively includes a disc opener 114, a set of gauge wheels 116, and a set of closing wheels 118. Seeds from tank 112 are fed by gravity into a seed meter 124. The seed meter controls the rate at which seeds are dropped into a seed tube 120 or other seed delivery system, such as a brush belt, from seed storage tank 112. The seeds can be sensed by a seed sensor 122, which generates a seed signal 123 indicative of a speed passing through seed tube 120. Signal 123 can be provided to pulsing valve control system 113.

In the example shown in FIG. 2, liquid material is pumped through supply line 111 to an inlet end of valve 109. Valve 109 is controlled by control system 113 to open and close to allow the liquid to pass from the inlet end of valve 109 to an outlet end. System 113 can use a pulse width modulated signal to control the flow rate through valve 109, but this is just one example and other control signals can be used to control valves 109.

As liquid passes through valve 109, it travels through an application assembly 115 from a proximal end (which is attached to an outlet end of valve 109) to a distal tip (or application tip) 117, where the liquid is discharged into a trench, or proximate a trench, opened by disc opener 142 (as is described in more detail below).

Before describing the operation of row unit 106 and valve control system 113 in more detail, a brief overview of some parts of row unit 106 and their operation, will first be discussed. First, it will be noted that there are different types of seed meters, and the one that is shown is shown for the sake of example only. For instance, in one example, each row unit 106 need not have its own seed meter. Instead, metering or other singulation or seed dividing techniques can be performed at a central location, for groups of row units 106. The metering systems can include rotatable discs, rotatable concave or bowl-shaped devices, among others. The seed delivery system can be a gravity drop system (such as that shown in FIG. 2) in which seeds are dropped through the seed tube 120 and fall (via gravitational force) through the seed tube into the seed trench. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and double disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor which may be located anywhere on row unit 106 where it can sense that load. It can also be placed where it may not sense the load directly, but a characteristic indicative of that load. Both sensing the load directly or indirectly are contemplated herein and will be referred to as sensing a force characteristic indicative of that load (or force). For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth. Arms (or gauge wheel arms) 148 illustratively abut against a mechanical stop (or arm contact member-or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted. This is described in greater detail below.

In operation, row unit 106 travels generally in the direction indicated by arrow 160. The double disc opener 114 opens a furrow in the soil 138, and the depth of the furrow 162 is set by planting depth actuator assembly 154, which, itself, controls the offset between the lowest parts of gauge wheels 116 and disc opener 114. As discussed above, seeds are metered or singulated by a metering system (e.g., seed meter 124) and positioned in a furrow by the seed delivery system. Where the seed delivery system is a gravity drop system, the seeds are dropped through seed tube 120, into the furrow 162 and closing wheels 118 close the soil. Where the seed delivery system is an assistive system, the seed is positioned in, or captured by, the assistive system and moved to a location proximate the furrow 162 where it is deposited or placed in the furrow 162. System 113 controls valve 109 to apply a liquid through application assembly 114 to the field over which row unit 106 is traveling. The liquid can be applied in, or proximate, furrow 162.

There may be seed sensors in both the seed metering system and the seed delivery system. In another example, there may be a seed sensor only in the seed metering system, or only in the delivery system, or elsewhere. In the example illustrated in FIG. 2, only seed sensor 122 is shown, and it is shown mounted to seed tube 120 so that it detects seeds passing through seed tube 120. A seed sensor on the seed metering system may sense the presence or absence of seeds in the seed metering system. The seed sensors are illustratively coupled to their corresponding systems (the seed metering system and/or seed delivery system) to sense an operating characteristic of the corresponding system. The sensors sense the presence or absence of a seed, or sense a characteristic indicative of a seed spacing interval within the system on which it is deployed.

The seed sensors can include a transmitter component and receiver component. The transmitter component emits electromagnetic radiation, or light, into the seed metering system or seed delivery system through a transparent or translucent side wall of the system. The receiver component then detects the reflected radiation and generates a signal indicative of the presence or absence of a seed adjacent to the sensor (e.g., sensor 122) based on the reflected radiation. Of course, this is just one example of a seed sensor, and others may be used as well. The seed sensor signal 123, generated by the seed sensor, is provided back to valve control system 113, where it can be conditioned (such as amplified, filtered, linearized, normalized, etc.).

FIG. 2 also shows that, in one example, a pressure sensor 127 is disposed to sense pressure in valve 109. The pressure sensor in valve 109 can be a differential pressure which measures the pressure drop across valve 109, or it can be a pressure sensor that senses the pressure on the outlet end of valve 109, but upstream of the distal tip 117 of application assembly 115. That can be compared to the supply line pressure sensed by pressure sensor 133 (or where there are multiple supply line pressure sensors the signal from the closest such sensor) to obtain the pressure drop across the valve 109. Pressure sensor 127 illustratively generates a pressure sensor signal indicative of the sensed pressure, and provides that pressure sensor signal to valve control system 113.

Figure 3:
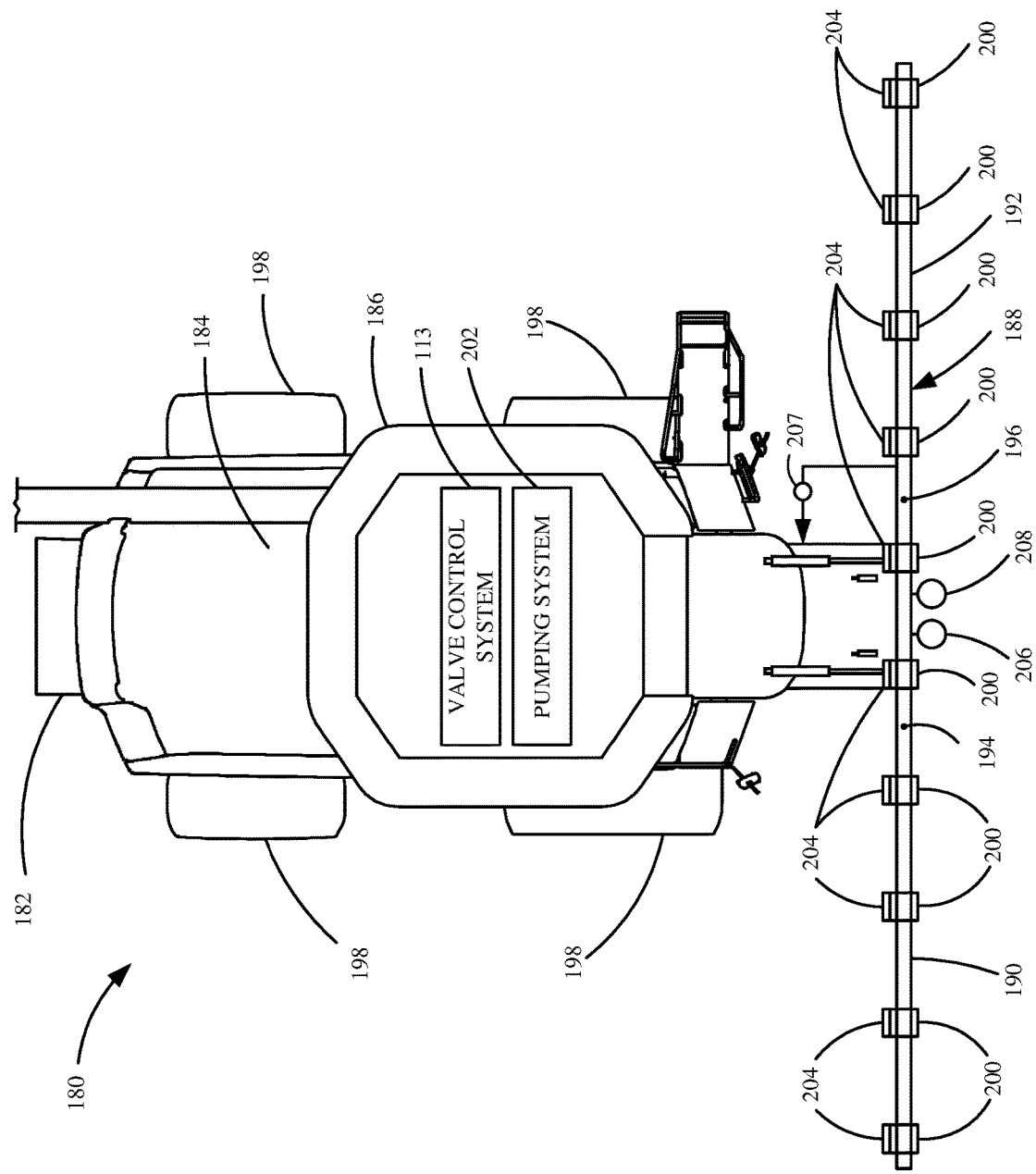
FIG. 3 shows a pictorial view of a self-propelled sprayer.

FIG. 3 is a partial pictorial, partial block diagram showing one example of a self propelled agricultural spraying machine (or sprayer) 180. Sprayer 180 illustratively includes an engine in engine compartment 182, an operator in operators compartment 184, a tank 186, that stores liquid material to be sprayed, and an articulated boom 188. Boom 188 includes arms 190 and 192 which can articulate or pivot about points 194 and 196 from a travel/storage position to a deployed position illustrated in FIG. 3. Agricultural sprayer 180 is illustratively supported for movement by a set of traction elements, such as wheels 198. The traction elements can also be tracks, or other traction elements as well.

When a spraying operation is to take place, boom arms 190 and 192 articulate outward to the position shown in FIG. 3. Boom 188 carries nozzles 200 that spray material that is pumped from tank 106 through boom 188 by pumping system 202, onto the field over which sprayer 180 is traveling. As with row unit 106 shown in FIG. 2, the flow of liquid material through each of the nozzles 200 is controlled by a corresponding valve 204. In the example illustrated in FIG. 3, each nozzle 200 has a corresponding valve 204. However, it will be noted that a single valve 204 may control the passage of material through multiple different nozzles. These and other architectures and arrangements are contemplated herein. The valves are controlled by valve control system 113.

FIG. 3 also shows that sprayer 180 illustratively includes a boom flow meter 206 and a boom pressure sensor 208.

Flow meter 206 illustratively senses a value indicative of the flow of liquid material from tank 186 through boom 188. In one example, the value is indicative of the mass flow rate of the liquid material through boom 188. FIG. 3 also shows that pressure sensor 208 illustratively senses the pressure within boom 188. Sprayer 180 can have a return line that returns liquid from boom 188 to tank 186. In that case, flow meter 207 senses the return flow so the flow of liquid applied through the nozzles 204 is the difference in flow measured or sensed by meters 206 and 207. Further, there can be additional boom pressure sensors along boom 188. For instance, there may be a pressure drop across boom 188 so that multiple pressure sensors along boom 188 capture this pressure drop. These and other arrangements are contemplated herein.

It will be noted that the various pressure sensors described herein can be arranged in a number of different ways. For instance, they can be arranged so that they are referenced to atmospheric pressure, or they can be arranged as sets of pressure sensors or a differential pressure sensor, so they can be used to obtain a differential pressure indicative of the pressure drop across the valves or across other portions of the agricultural machine that is delivering the liquid material to the field.

Figure 4:
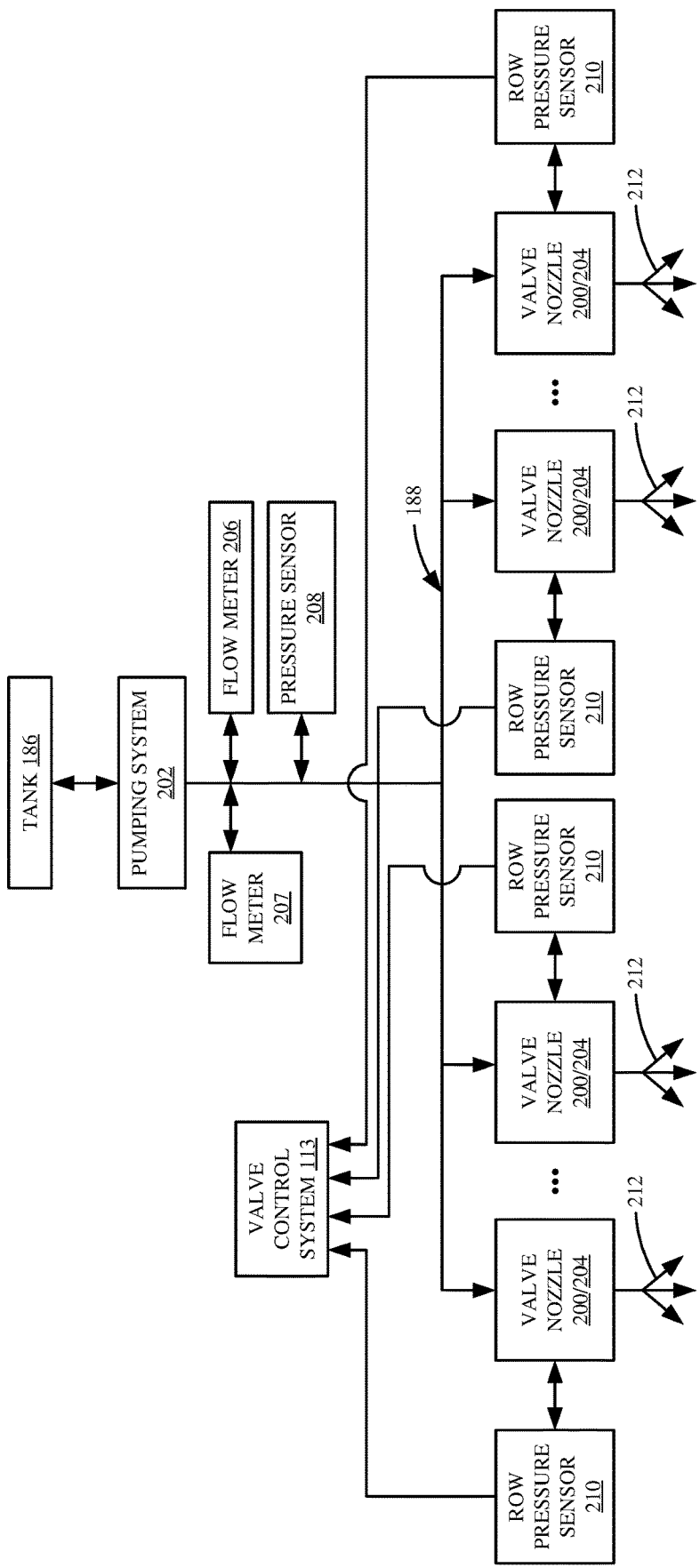
FIG. 4 is a block diagram of one example of a portion of the sprayer shown in FIG. 3.

FIG. 4 is a partial block diagram, partial schematic diagram showing one example of a portion of sprayer 180, illustrated in FIG. 3. Some of the items illustrated in FIG. 4 are similar to those shown in FIG. 3, and they are similarly numbered.

FIG. 4 shows that a row pressure sensor 210 is disposed relative to each valve 204 or nozzle 200 (or to an outlet hose where one is used) on boom 188. Row pressure sensors 210 are configured so that they provide a signal indicative of the pressure drop across the valve 200 or the nozzle 204, or the valve/nozzle combination 200/204 or so that such a value can be derived. By way of example, it may be that row pressure sensor 210 senses the pressure at the outlet end of valve 204 and the inlet end of nozzle 200. This pressure can be compared to the boom pressure sensed by boom pressure sensor 208 (or, where multiple boom pressure sensors are provided along boom 188, the boom pressure sensor located closely proximate the row pressure sensor 210 under analysis) in order to obtain a pressure drop across valve 204. Sensor 210 can also be referenced to atmospheric pressure in order to obtain a pressure drop across nozzle 200. Thus, by sampling the row pressure sensor signal during pulsed operation of valve 204, the value of the row pressure can be used to determine whether valve 204 is operating, whether nozzle 200 is clogged or partially clogged, the duration of the pulses in the pulsed operation of valve 204, the amount of liquid material that flows through valve 204 and nozzle 200 during each pulse, among other things. These are all described in greater detail below. In one example, the valves are controlled so that the liquid material flows through nozzles 200 and is sprayed (as indicated by arrows 212) onto the field 214 over which the sprayer is traveling.

It will be noted that valve control system 113 illustratively generates control signals to control valves 204. The control signals are illustratively pulsed control signals (such as pulse width modulated signals) where the amount of time that the valves 200 are open and closed is determined by the duty cycle of the pulse width modulated signal). This is just one example and control system 113 need not control valves 204 with a pulsed control signal. It will also be appreciated that valve control system 113 can be similar to, or different from, valve control system 113 described above with respect to FIGS. 1 and 2. For the purposes of the present description, it will be assumed that they are similar, so that only valve control system 113, described with respect to FIGS. 1 and 2 above, will be described in more detail.

Figure 5:
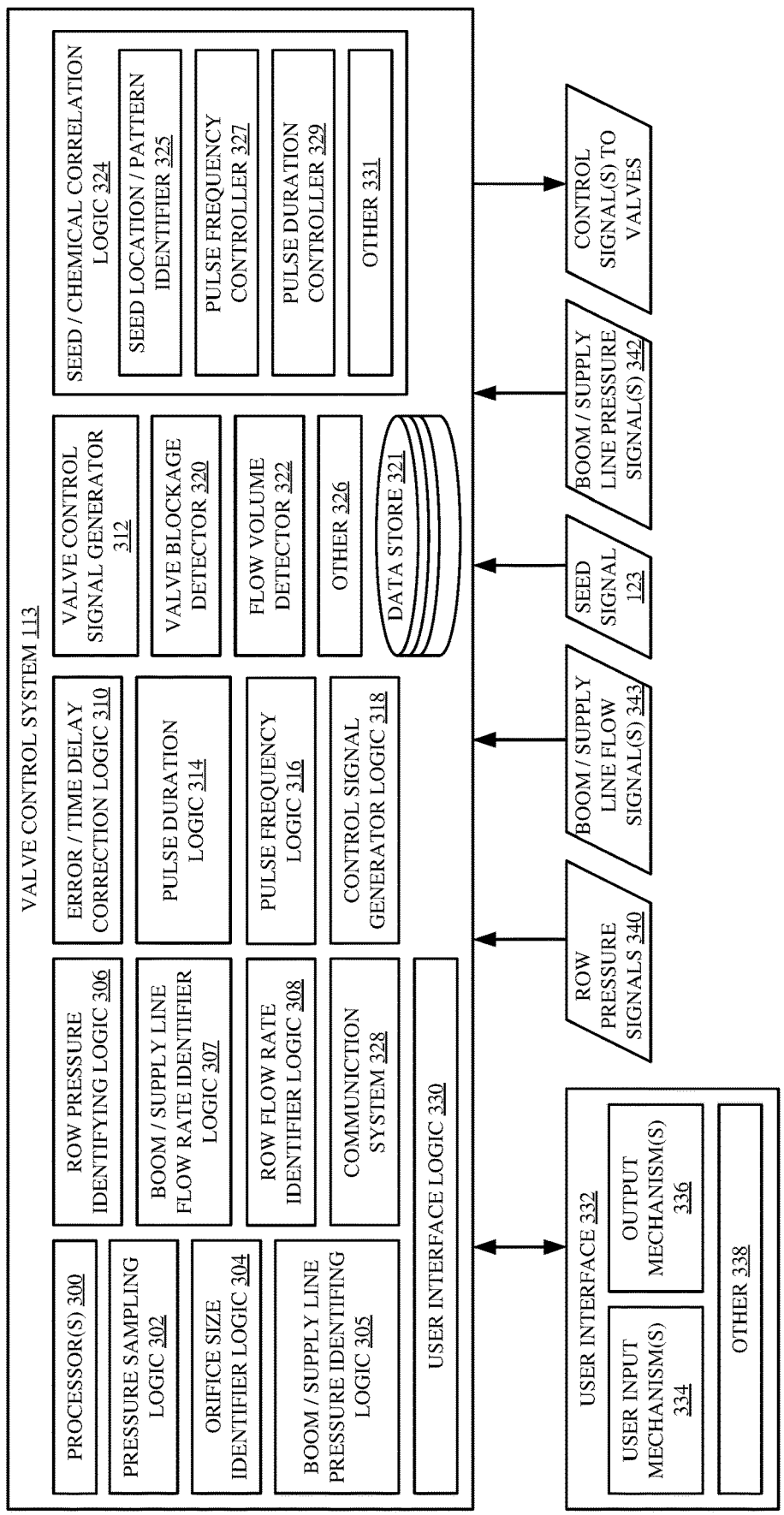
FIG. 5 is a block diagram of one example of a valve control system.

FIG. 5 is a block diagram showing one example of valve control system 113 in more detail. In the example shown in FIG. 5, valve control system 113 illustratively controls the valves using a pulsed control signal, so that some items dealing with the pulsed operation are described. However, where the control signal is not a pulsed control signal, those items need not be used.

Valve control system 113 illustratively includes one or more processors 300, pressure sampling logic 302, orifice identifier logic 304, row pressure identifying logic 306, row flow rate identifier logic 308, error/time delay correction logic 310, valve control signal generator 312, pulsed duration logic 314, pulse frequency logic 316, control signal generator logic 318, valve blockage detector 320, data store 321, flow volume detector 322, seed/chemical correlation logic 324, and it can include other items 326. Seed/chemical correlation logic 324 can include seed location/pattern identifier 325, pulse frequency controller 327, pulse duration controller 329 and it can include other items 331. It will also be noted that, in one example, valve control system 113 can include a communication system 328 and user interface logic 330. In another example, communication system 328 and user interface logic 330 are items in the operator compartment 184 of sprayer 180, or in the operator compartment of a towing vehicle (such as a tractor) that is towing planter 100. In any case, valve control system 113 may be able to interact with a user interface 332 that can include user input mechanisms 334, output mechanism 336, and it can include other items 338.

FIG. 5 also shows that, in one example, valve control system 113 can receive the row pressure sensor signals 340 generated by the row pressure sensors 210 or 127. It can receive boom/supply line pressure signal(s) 342 that is generated by boom pressure sensor 208 or supply line pressure sensor 133 and, where multiple boom or supply line pressure sensors are used, it can receive signals 342 from each of them. It can receive boom/supply line flow signal(s) 343 generated by flow sensors (or flow meters) 131, 206 and, where a return line is used, it can receive the flow signals from meters 135 and 207 as well. It is also shown receiving seed signal 123.

Before describing the valve control system 113, and its operation, in more detail, a number of items in control system 113, and their operation will first be described.

Pressure sampling logic 302 illustratively samples the pressure signals generated by row pressure sensors 210 and boom pressure sensor(s) 208. In one example, it samples the pressure at a frequency that is higher than the frequency of the pulse width modulated signal that is used to control valves 200. Thus, the pressure drop across the valves can be sampled at the same frequency as well. In one example, the sampling frequency is high enough so that the duty cycle of the pulse width modulated signal that is applied to each valve (or characteristic of the actual pulse of liquid through the valve—such as pulse duration, pulse frequency, etc.) can be identified within a threshold amount of time. For example, it may be that the pressures (or the signals) are sampled at a rate which is multiple times that of the duty cycle of the pulse width modulated signal. In one example, the sampling rate is sufficient so that a pressure signal can be sampled twice during the active portion of the pulse width modulated signal. In another example, the sampling frequency is sufficient so that the pressure signal can be sampled 4 times, 8 times, or more, during the active portion of the duty cycle of the pulse width modulated signal. With a sufficient sampling rate, the duration of the pulse of liquid material through the corresponding valve can be identified with a relatively high degree of accuracy, as can the beginning and the end of the pulse of liquid. The higher the sampling frequency, the higher the accuracy with which the characteristics of the pulse can be identified, and thus, the higher the accuracy with which the beginning and end of the pulse, the pulse frequency and pulse duration can be identified.

Row pressure identifying logic 306 illustratively receives the row pressure signals 340 and generates a row pressure signal or value indicative of the row pressure measured by the corresponding row pressure sensor. This can be the pressure within the body of the valve 204, or it can be pressure at the outlet end of the valve (or further down stream toward the outlet end of the application assembly), so that the pressure drop across the valve can be identified. By way of example, if the valve is opened and the pressure at the outlet end of the valve measures at approximately atmospheric pressure (or at the same level of the other valves or at another expected level), then this will mean that the nozzle which is being fed by the valve is unclogged, and is allowing the liquid material to pass through it and be dispersed on the field. Thus, the pressure drop across the valve will be indicative of the value of the boom pressure indicated by the boom pressure sensor signal(s) 342 less the pressure sensed by the row pressure sensor being processed. However, if the valve is open, but the row pressure sensor signal indicates that the measured row pressure is higher than the expected pressure, this may mean that the corresponding nozzle is clogged, or partially clogged. Thus, it will be appreciated that row pressure identifying logic 306 can identify the actual pressure measured by the row pressure sensor being processed, or it can identify the pressure drop across the valve corresponding to the row pressure sensor signal, or both. These and other architectures are contemplated herein.

Flow rate identifier logic 308 illustratively receives the boom/supply line flow signal 340, indicative of the flow rate of liquid material through the boom or supply line, that is generated by flow meter 206 or flow meter 131. Where no return line is used, then these flow signals represent the total flow of liquid applied to the field. Where a return line is used, then the return flow signal is also received from meter 135 or 207 so the applied flow can be determined based on the difference between the flows measured by the meters. Row flow rate identifier logic 308 divides the mass flow rate applied by the number of active valves or nozzles, to identify an average flow rate through each nozzle. Orifice identifier logic 304 can then identify the average orifice size for each nozzle based upon the pressure drop across the corresponding valve, and based upon the average flow rate through the valve. This can be done using the following equation:

$$F_V = \text{Valve } C_v * \sqrt{P_B - P_R} \qquad \text{Eq. 1}$$

where $F_V$ is the flow rate through a valve;

Valve $C_v$ is a flow coefficient that represents the average orifice size of the valves;

$P_B$ is the boom (or supply line) pressure indicated by one of boom/supply line pressure signal(s) 342; and $P_R$ is the row pressure identified by row pressure signal 340.

Error/time delay correction logic 310 illustratively compares the pulse width modulated control signal that is controlling the valves to the row pressure signal to identify a time delay between when the control signal controls the valve to open or close and when the row pressure signal indicates that the valve actually opened or closed.

There may be a time delay for a variety of different reasons. For instance, it may take more or less time to open or close the valve based on general valve characteristics (such as spring strength), the current driver which drives the valve solenoid, the system pressure, the liquid characteristics, etc. These parameters can vary, and this can affect application accuracy, application rate, etc. Logic 310 can identify these delays in near real time, during operation. It generates error or delay signals indicative of the errors or delays and provides them to seed/chemical correlation logic 324. As is described in more detail below, seed location/pattern identifier 325 can identify seed location or a pattern indicative of that location. Pulse frequency controller 327 and pulse duration controller 329 can use that information, along with the time delays, and can determine when the valves should be actuated, and for how long, to dispense the liquid material where desired. Based on the signals from seed/chemical correlation logic 324, pulsed valve control signal generator 312 controls the valves to dispense the liquid material at the seed/plant location (e.g., for fertilizer), between seed/plant locations (e.g., for herbicide), or elsewhere.

Before describing that correlation is more detail, it should be noted that error/delay correction logic 310 also illustratively compares the flow rate through a particular valve (based upon the pressure drop across that valve and the calculated orifice size) and compares it against a target flow rate (which may be identified based on the boom or supply line flow rate, or the applied flow rate, divided by the number of nozzles on the system), the system average flow rate, or it may compare the flow rate across a given nozzle to the flow rate across other nozzles on the sprayer or planter. Based upon the comparison, error correction logic 310 may identify errors introduced because of specific gravity considerations. It can then generate corrections for specific gravity of the liquid, when the specific gravity of the liquid is obtained by error correction logic 310. In one example, an operator can use user input mechanism 334 to enter the specific gravity of the liquid. In another example, the identity of the liquid can be obtained and the specific gravity of that liquid can be obtained from a remote system, from local memory (e.g., from data store 321), etc.

Pulse duration logic 314 illustratively identifies the beginning of the pulse of liquid, the end of the pulse of liquid and the duration of the pulse of liquid through the valve corresponding to each row, based upon the sampled row pressure signals. This was described above. Pulse frequency logic 316 illustratively identifies the frequency of the pulse of liquid through the valve, as also discussed above.

Valve blockage detector 320 illustratively identifies valve blockages based upon the various sensor signals. For instance, as discussed above, if the pressure drop across a particular valve is relatively small, even when the valve is open, then this may indicate that that a nozzle is blocked, or partially blocked. The pressure drop across a valve may be compared to an expected pressure drop, to determine whether the nozzle is blocked, partially blocked, or whether the valve is broken, among other things. In another example, instead of comparing to an expected value, the pressure drop across the valve can be compared against that of other valves. This overcomes effects related to things like varying viscosity because, at any given time, the valves are all likely to be subject to similar conditions (which would affect things like viscosity).

Flow volume detector 322 illustratively detects the volume of flow across a particular valve for each activation of the valve. For instance, if the duration of the active portion of the pulse width modulated signal is identified by pulse duration logic 314, and the flow rate through the corresponding valve and nozzle combination is identified by row flow rate identifier logic 308, then the volume of liquid material dispensed for each valve actuation can be identified by flow volume detector 322.

In addition, logic 308 can identify the flow rate for all rows. They can be aggregated over some time period and compared to the applied flow rate over that time period. Any difference can be used to adapt the flow rate calculation and therefore the pulse length commands as well. This can be used to deal with viscosity and other similar unknowns.

Seed/chemical correlation logic 324 illustratively receives seed signal 123 and the pulse start, pulse end, and pulse duration and pulse frequency from logic 314 and 316, respectively, and generates a signal indicative of whether the liquid is to be dispensed at the seed/plant locations or between those locations or elsewhere, and also indicative of when the valve should be actuated, and for how long, to dispense the liquid at those locations. It can, for instance, correlated the dispersal of chemical through a particular nozzle, with the delivery of a seed through a corresponding row unit. By way of example, if the row unit illustrated FIG. 2 drops a seed, and the chemical being delivered by the application assembly is a fertilizer chemical, then seed/chemical correlation logic 324 correlates the timing between depositing a seed in the furrow, and the application of chemical through the pulse width modulated operation of valve 109. In this way, chemical can be applied in on a per-seed basis which enhances the efficient application of chemical, where needed. Further, if the sprayer in FIGS. 3 and 4 is to spray a herbicide between the plant locations, then logic 324 correlates timing between actuating the valves and the plant locations. The operation of seed/chemical correlation logic 324 is described in greater detail below with respect to FIG. 7.

Control signal generator logic 318 can illustratively generate other control signals, based upon the various sensor signals and values generated. The control signals can be used to control any of a wide variety of different types of controllable subsystems, such as the speed of a sprayer or towing vehicle, the seed delivery system or seed metering system, operator interface logic 330, or a wide variety of other controllable subsystems. Also, valve control signal generator 312 can control the actuation of valves 109, 200.

Figure 6A:
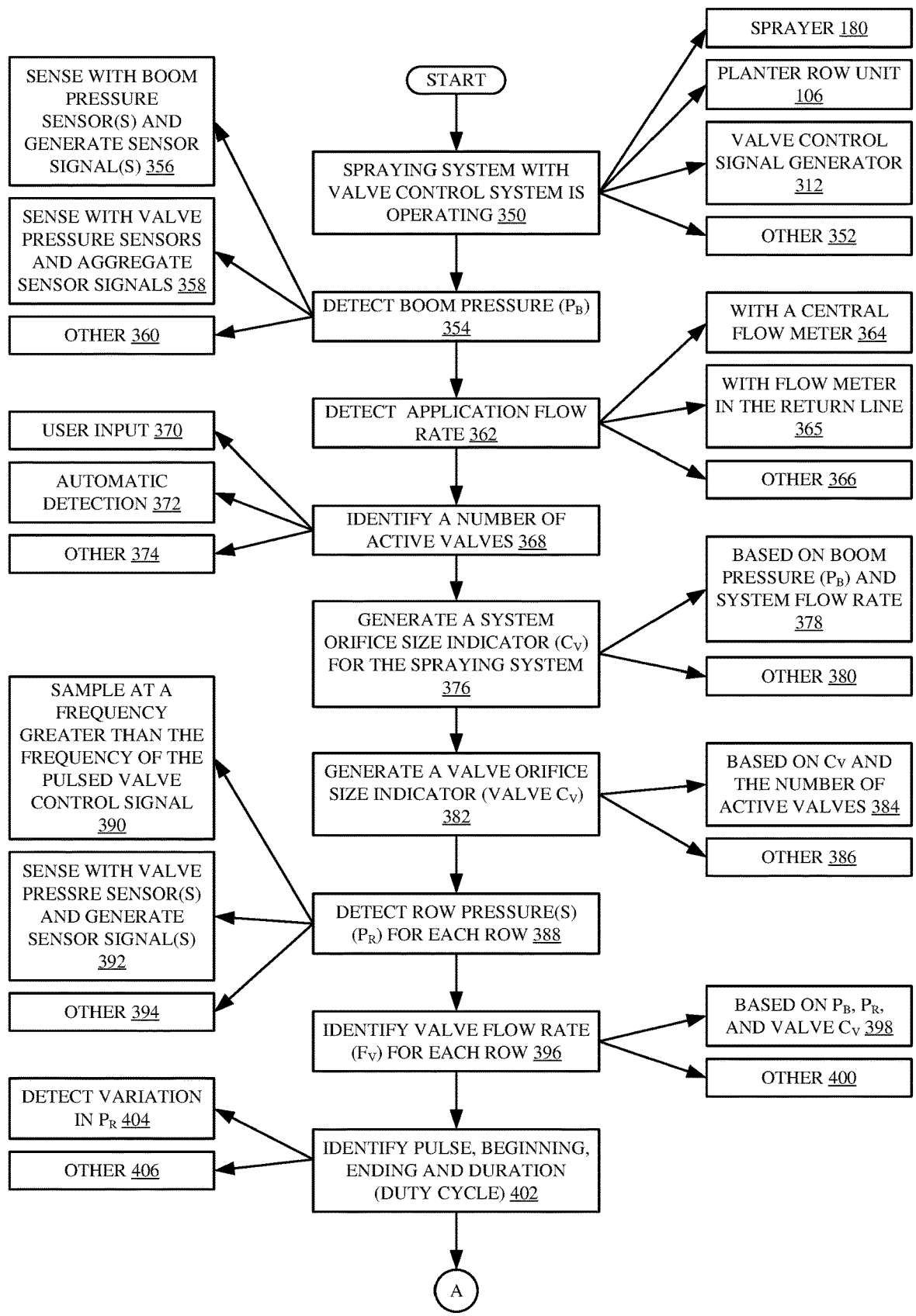
FIGS. 6A and 6B (collectively referred to herein as FIG. 6) show a flow diagram illustrating one example of the operation of the valve control system.
Figure 6B:
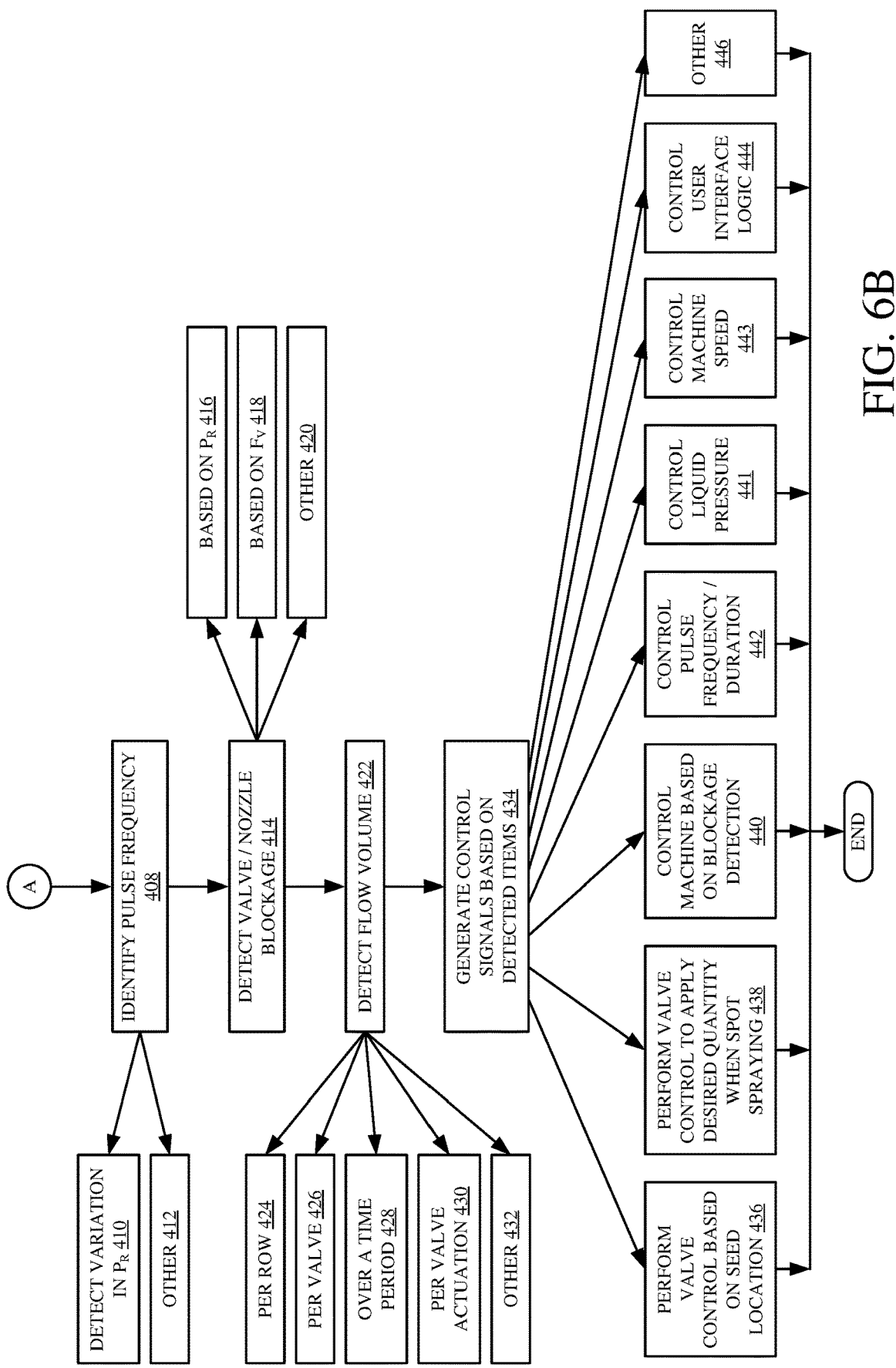

FIGS. 6A and 6B (herein after referred to as FIG. 6) show a flow diagram illustrating one example of the operation of valve control system 113 in generating control signals based upon the various sensor inputs. It is first assumed that a spraying system (or chemical application system) with a valve control system 113 is operating. This is indicated by block 350 in the flow diagram of FIG. 6. In one example, the system is deployed on a sprayer 180. In another example, it is deployed on a planter row unit 106. Further, it is assumed that the valve control signal generator 312 is generating pulsed signals to control the various valves through which the liquid is being applied or sprayed. However, the valves may be controlled in other ways, where the control signals are not pulsed, in which case some of the description below regarding pulsed valve control signals does not apply. The spraying system can be operational in other ways as well, and this is indicated by 352.

Boom/supply line pressure identifier logic 305 then detects the boom pressure from boom/supply line pressure signal(s) 342. The boom pressure is indicated by PB. Detecting the boom pressure PB is indicated by block 354 in the flow diagram of FIG. 6. In one example, it is sensed with the boom pressure sensor 208 or supply line pressure sensor 131, which generates the sensor signal 342. It can also be sensed by different boom pressure sensors located at different locations across boom 188 or supply line 111. This is indicated by block 356. The boom pressure sensor can be generated by aggregating sensor values sensed by different sensors. For instance, one or more of the row pressure sensor signals can be aggregated to obtain the boom pressure value. This is indicated by block 358 in the flow diagram of FIG. 6. The boom pressure can be sensed and identified in other ways as well. This is indicated by block 360.

Boom/supply line flow rate identifier logic 307 then detects the application flow rate (e.g., the flow of liquid from tank 186 or 107 into either boom 188 or supply line 111, respectively. This is indicated by block 362 in the flow diagram of FIG. 6. This can be sensed using the central flow meter 206 or supply line flow meter 131. This is indicated by block 364. In an example in which a return line is used, the flow through the return line can also be measured and subtracted from the flow into boom 188 or supply line 111. This is indicated by block 365. It can be sensed in other ways as well, such as aggregating the flow rate through the various valves or nozzles that the liquid material is passing through. This is indicated by block 366.

Orifice identifier logic 304 then identifies a number of active valves or nozzles in the system. This is indicated by block 368. In one example, this can be input by the operator using operator input mechanisms 334. Determining the number of active valves or nozzles based on an operator or user input is indicated by block 370 in the flow diagram of FIG. 6. It can be done by detecting the number of active valves or nozzles automatically. For instance, when the valves are turned on, the value of the row pressure sensed by row pressure sensors 210 can be identified to determine whether fluid is passing through a valve and/or nozzle. In this way, the number of active valves or nozzles can be identified automatically. Identifying the number of active valves automatically is indicated by block 372. The number of active valves can be identified in other ways as well. This is indicated by block 374.

Orifice identifier logic 304 then generates a system orifice size indicator ($C_v$) for the spraying system. The system orifice size indicator $C_v$ will illustratively be an aggregate of all the orifices of the active nozzles. Generating the system orifice size indicator $C_v$ is indicated by block 376 in the flow diagram of FIG. 6.

In one example, the system orifice indicator is based on the boom pressure PB and the application flow rate. The boom pressure PB is illustratively indicated by the sensor signal from boom pressure sensor 208. The application flow rate is illustratively indicated by the signal from flow meter 206 (and where a return line is used, based on the flow rate indicated by meter 207 as well). Generating $C_v$ based on the boom pressure and application flow rate is indicated by block 378 in the flow diagram of FIG. 6. The same can be generated for planter 100 based on the supply line pressure from sensor 132 and flow valve from flow meter 131 (and possibly flow meter 135). It can be generated in other ways as well. This is indicated by block 380.

Orifice identifier logic 304 then identifies a valve orifice size indicator (Valve $C_v$) which is indicative of the orifice size of the valves (or the valve/nozzle combination) on the sprayer boom. Generating the valve orifice size indicator $C_v$ is indicated by block 382 in the flow diagram of FIG. 6. In one example, Valve $C_v$ is based upon the system $C_v$ and the number of active valves. For instance, the system $C_v$ can be divided by the number of active valves to obtain a size for each valve orifice. This is indicated by block 384. The Valve $C_v$ can be identified in other ways as well. This is indicated by block 386.

The row pressure identifying logic 306 detects a row pressure ($P_R$) for each row. This is indicated by block 388. In one example, the row pressure is sampled based upon a sampling frequency indicated by pressure sampling logic 302. The row pressure can be sampled at a frequency that is greater than the frequency of the pulsed valve control signal (e.g., the pulse width modulated valve control signal). This is indicated by block 390. The row pressures can be sampled by sampling the row pressure signals 340 from each of the row pressure sensors 210, 127. This is indicated by block 392. The row pressure, for each row, can be detected in other ways as well. This is indicated by block 394.

Row flow rate identifier logic 308 then identifies a valve flow rate ($F_V$) for each row. The value $F_V$ will identify the mass flow rate of an amount of liquid material passing through the valve when the valve is actuated by the pulse width modulated control signal. Identifying $F_V$ for each row is indicated by block 396.

In one example, $F_V$ can be identified based on $P_B$, $P_R$ and valve $C_v$. For instance, the valve flow rate can be identified using equation 1 above. This is indicated by block 396. The valve flow rate can of course be identified in other ways as well, such as by placing individual flow meters on the valves, or in other ways. This is indicated by block 400.

Pulse duration logic 314 then identifies the beginning of each pulse, the end of each pulse, and the pulse duration (or the time that the valve is open). This is indicated by block 402. In one example, the row pressure is monitored so that when the row pressure changes (indicating that the valve is open) this is monitored to identify when the pressure indicates that the valve is opened (the beginning of each pulse). The row pressure is also monitored to identify when the pressure indicates when the valve is closed (the end of the pulse). The amount of time between when the valve opens and when it closes will identify the duration of the pulsed flow of liquid material through the valve for that pulse. Thus, in one example, the row pressure is sampled at a high enough frequency that the beginning and end of the pulse and the pulse duration can be identified with a desired accuracy. The higher the sample frequency, the more accurately these pulse characteristics can be identified. Identifying the pulse beginning and end and the pulse duration based on a detected variation of $P_R$ is indicated by block 404. The pulsed duration can be identified in other ways as well, and this is indicated by block 406.

Pulse frequency logic 316 then identifies the pulse frequency. In one example, the pulse frequency is determined based upon the amount of time between transitions in the pulse width modulated signal from an inactive state to an active state. The frequency with which the pulse width modulated signal makes this transition is illustratively a measure of the pulse frequency, itself. Identifying the pulse frequency is indicated by block 408.

As with the pulse duration, in one example, the pulse frequency can be identified by detecting variations in the row pressure PR indicating the valve opening and valve closing transitions. This is indicated by block 410. The pulse frequency can be identified in other ways as well, and this is indicated by block 412.

Valve blockage detector 320 then detects whether a given valve is blocked. This is indicated by 414. For instance, detector 320 can monitor the row pressure signals 340 for each of the rows and identify whether the row pressure is changing with the pulse width modulated control signal (or with ah non-pulsed control signal). By way of example, if the row pressure remains the same, regardless of whether the corresponding valve is open or closed, this may indicate that the valve or nozzle is blocked or broken. Similarly, the amplitude of the pressure change can be monitored as well. If the pressure change is only slight, depending on whether the valve is open or closed, this may indicate that the nozzle is partially blocked. Detecting a valve or nozzle blockage based upon the row pressure $P_R$ is indicated by block 416.

The valve or nozzle blockage can also be detected based upon the valve flow rate $F_V$. If the flow rate through the valve is zero or less than expected, even when the valve is open this may indicate that the valve or nozzle is fully blocked or partially blocked. Detecting whether the valve or nozzle is blocked based on $F_V$ is indicated by block 418.

Detecting whether the valve or nozzle is blocked or partially blocked can be done in other ways as well. This is indicated by block 420.

Flow volume detector 322 then detects the volume of liquid flow in the system. This is indicated by block 422. The flow volume can be detected at a number of different levels. For instance, the volume of liquid flow at each row (through each valve or valve/nozzle combination) can be identified. By way of example, it can be identified based upon the flow rate through each valve/nozzle combination, and the duty cycle of the control signal (or the amount of time that the valve is actually open). Identifying the flow volume on a per row basis is indicated by block 424.

In some cases, it may be that a single valve services multiple nozzles. In that case, the flow volume can be identified on a per-valve basis. This is indicated by block 426. The flow volume through a valve or valve/nozzle combination can be identified over a given period of time (such as the volume of flow per minute), etc. This is indicated by block 428. In another example, the flow volume can be identified for each valve actuation (e.g., the amount of liquid passing through the valve for each valve actuation can be identified). This is indicated by block 430. The flow volume can be detected in other ways as well. This is indicated by block 432.

Based upon all of the values that are detected and/or generated, control signal generator logic 318 and valve control signal generator 312 then illustratively generate control signals to control the system. This is indicated by block 434.

Logic 312 can generate a wide variety of different types of control signals. For instance, it can use seed/chemical correlation logic 324 to perform valve control based upon seed or plant location, so that liquid material is sprayed at the location of each seed or plant, between them, or relative to them in other ways, etc. This is indicated by block 436. It can perform valve control to apply a desired quantity when spot spraying. Since the flow volume is known on a per system and per nozzle basis, then the valves can be controlled by valve control signal generator 312 to apply a desired volume at a desired location (such as when spot spraying for weeds or otherwise). The control can be performed based on the time delay detected by logic 310 or in other ways as well. Performing valve control to apply a desired quantity when spot spraying in indicated by block 438.

Control signal generator logic 312 can control the machine based upon blockage detection. For instance, when a blockage of a particular nozzle or valve is detected, then the control signal for that valve can be disabled until the blockage is remedied. At the same time, control signal generator logic 318 can control user interface logic 330 to raise an alert for the operator. Similarly, logic 312 can control the frequency of the pulse width modulated control signal in an attempt to clear the blockage. Control signals can be generated to control the machine based on blockage detection in other ways as well. This is indicated by block 440.

Control signal generator logic 318 can also generate a control signal and provide it to valve control signal generator 312 so that the pulse width modulated signals are generated to control the pulse frequency or duration. By way of example, assume that a sprayer is treating a certain type of plant or weed, and the application of additional liquid volume may be desired at a particular point in the field. The pulse frequency or pulse duration of the pulse width modulated signal can be varied to adjust the volume of liquid material applied. This is indicated by block 442.

In another example, the system may be meant to apply liquid to a specific spot (e.g., close to the plant). The length of the spot to which liquid is applied will be dependent on valve actuations and driving speed. At relatively higher speed, the spot may be so long that the amount of liquid is not sufficiently concentrated. Thus, logic 318 can generate a pump control signal to control the pump that pumps the liquid material to increase pressure at higher speeds and decrease pressure at lower speeds. Controlling the pump to adjust pressure based on travel speed is indicated by block 441. In another example, logic 318 generates speed control signals to control machine speed to attain the desired concentration. These can also be done while controlling the valves as well.

Control signal generator logic 318 can also generate a control signal to control user interface logic 330 in various ways. This is indicated by block 444. By way of example, when a blockage is detected, a user interface output mechanism 336 can be controlled to surface this information for the operator. Mechanism 336 may be a visual, audible or haptic output device that is controlled to alert the operator to a blockage, or a set of blockages. The user interface logic can be controlled in other way as well.

It will be appreciated that a wide variety of other control signals can be generated. The control signals can be used to control subsystems of a planter 100, of a towing vehicle, of a self propelled sprayer 180, or a wide variety of other items. This is indicated by block 446.

Figure 7:
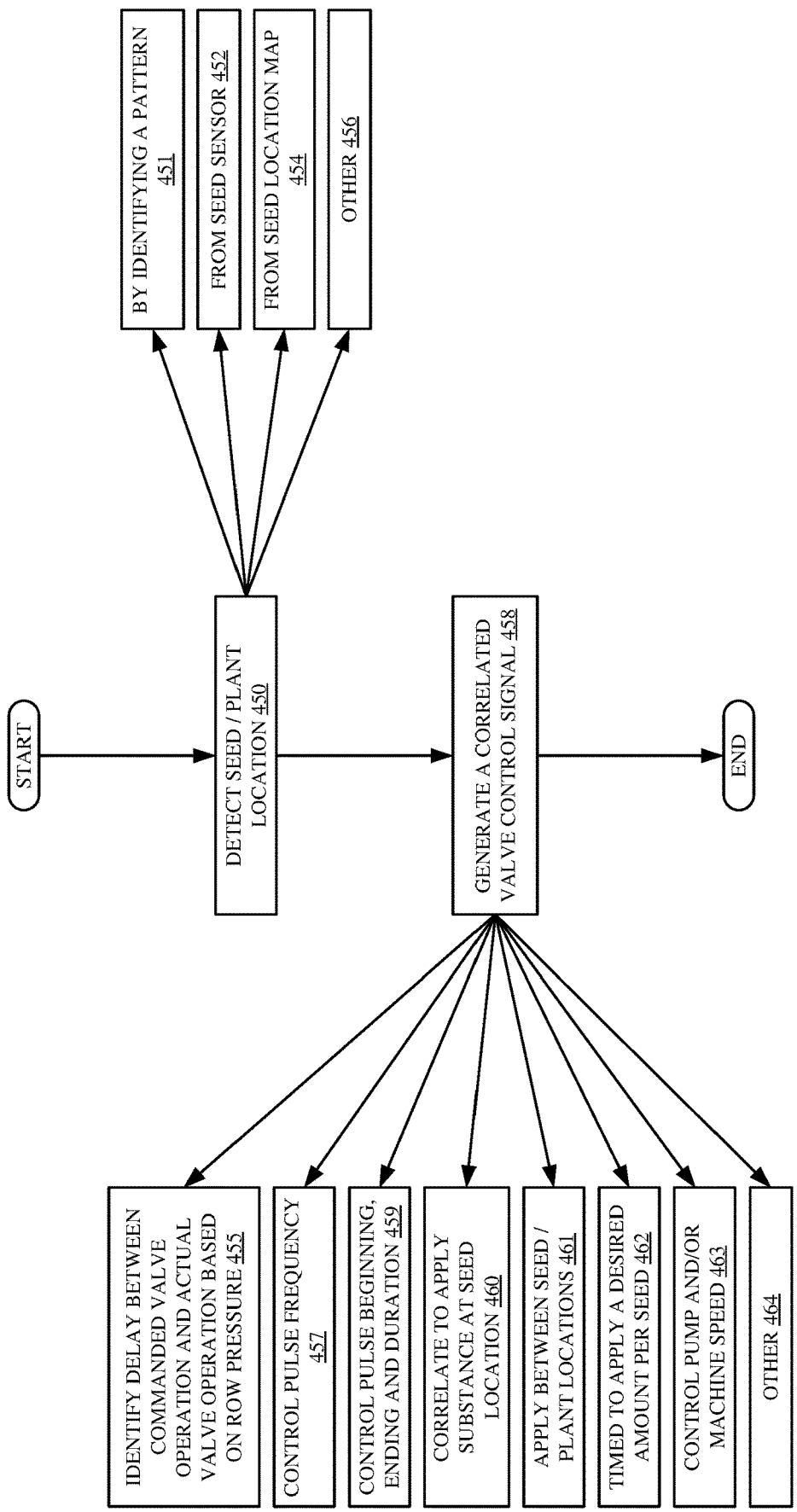
FIG. 7 is a flow diagram showing one example of the operation of seed/chemical synchronization logic.

FIG. 7 is a flow diagram illustrating one example of the operation of seed/chemical correlation logic 324 in correlating the application of a liquid chemical with seed or plant location. Seed/chemical correlation logic 324 first detects the seed/location indicating the location of a seed/plant. The seed/plant location can be detected in a variety of different ways. For instance, the number of seed signals 123 can be detected for a threshold time period of time by seed location/pattern identifier 325. Identifier 325 can then detect a pattern indicative of seed location. For example, it may identify that, based on the seed signal 123, and the speed or location of the planter sensed by a speed sensor or location sensor (such as a GPS receiver), a seed is being dropped every 6 inches, beginning at a location identified by the seed signal 123. Once the pattern is identified, controllers 327 and 329 can control valves 109, 204 to apply the liquid as desired, relative to the seeds or plants. They can control the pulse of liquid (its beginning and ending, its frequency and duration) so it applies the liquid at the seed/plant locations, between those locations, elsewhere, etc.

In another example, identifier 325 identifies the seed/plant location based on the current seed signal 123. For instance, it can identify seed location by detecting seed presence at the seed sensor and determining how long it will take for the seed to reach the ground. Based on that time, logic 327 and 329 can control the timing, pulse frequency and/or duration, respectively to apply the liquid material as desired relative to the seed.

Detecting the seed/plant location is indicated by block 450. Detecting the location by identifying a pattern is indicated by block 451. Detecting the seed/plant location from a seed sensor signal 123 is indicated by block 452. The seed location can be identified in other ways as well. For instance, if a seed location map was generated when seeds were planted, that map may be stored (e.g., remotely or in data store 321) and may identify the geographical coordinates of the seed/plant locations. Thus, when a sprayer is traveling over that portion of a field later, it can obtain the seed location map and identify seed location based upon that map. When it travels over the field, it can selectively apply the liquid material based on the seed locations. Detecting seed location based upon a seed location map is indicated by block 454.

The seed location can be detected in other ways as well. This is indicated by block 456.

Seed/chemical correlation logic 324 then provides an output to valve control signal generator 312 to generate a correlated, valve control signal, that is correlated to apply the liquid material based upon the seed/plant location. This is indicated by block 458. In doing so, time delay correlation logic 310 identifies a time delay between when a valve is commanded to open or close and when it actually opens or closes based on liquid pulse beginning and ending (as detected by pulse duration logic 314) which is, itself, based on the variation in the sensed row pressures. This is indicated by block 455 and it can be done for each valve that is being controlled. In addition, the time for the liquid to reach the field after passing through the nozzle can be sensed or estimated as well. Based on these delays, various parameters of the liquid pulse can be controlled to correlate the liquid delivery with the plant location to apply the liquid at a desired location relative to the plant location. The pulse frequency can be controlled by pulse frequency controller 327, as indicated by block 457. The pulse duration can be controlled by pulse duration controller 329, as indicated by block 459. In one example, the control signal provided to pulsed valve control signal generator 312 controls generator 312 to generate the pulse width modulated signal in order to synchronize the application of the liquid substance to the seed/plant location. This is indicated by block 460. In another example, the control signals are also generated, and timed, to apply a desired amount of the liquid material per seed. This is indicated by block 462. By way of example, once the flow rate through each nozzle or valve is known, timing and the duration of the pulse width modulated signal can be varied to apply a desired amount of material relative to a known seed/plant location. For instance, a small amount of material may be applied on either side of the seed while a relatively large amount of the material is applied at the same location of the seed. This is just one example. Also, the pulse width modulated signal can be generated to apply the liquid between (or to the side of or otherwise offset from) the seed/plant locations. This is indicated by block 461. Similarly, the machine speed and/or pump pressure (e.g., pump displacement, etc.) can also be controlled to apply a desired amount at a desired spot. This is indicated by block 463. Generating a correlated pulsed valve control signal, that is correlated to seed location, can be performed in other ways as well. This is indicated by block 464.

Figure 8:
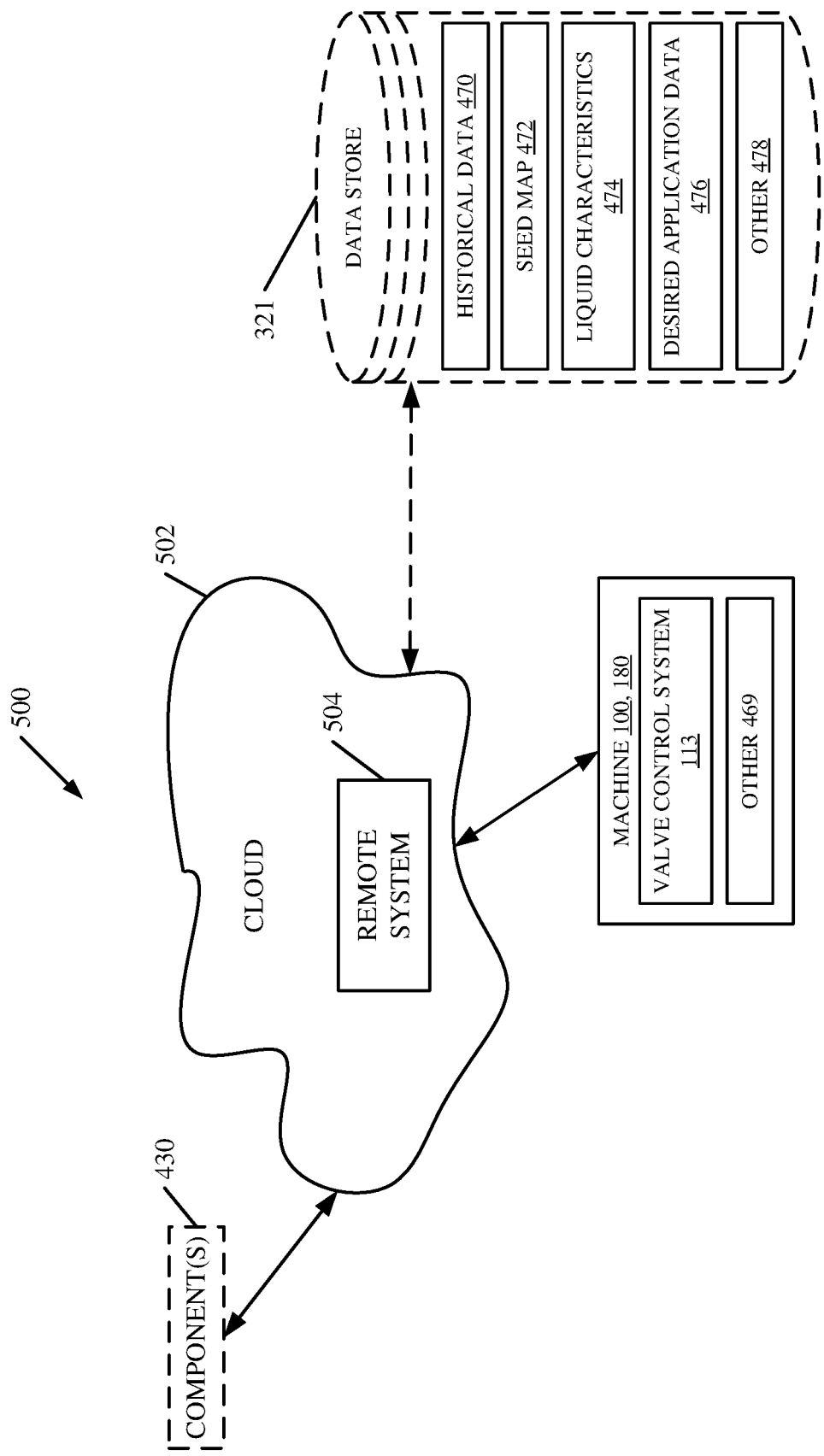
FIG. 8 shows an example of a machine in a remote server architecture.

FIG. 8 is a block diagram of an architecture in which machines are disposed in a remote server (or cloud computing) architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 500 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in previous Figures and they are similarly numbered. FIG. 8 specifically shows that the machines 100, 180 can communicate (by using communication system 428 in pulsing valve control system 113) with one or more remote systems 504 located in cloud 502 (which can be public, private, or a combination where portions are public while others are private).

FIG. 8 also depicts another example of a cloud architecture. FIG. 8 shows that it is also contemplated that some components 430 of pulsing valve control system 113 can be disposed in cloud 502 while others are not. By way of example, data store 321 can be disposed outside of cloud 502, and accessed through cloud 502. In one example, data store 321 can include historical data 470, one or more seed maps 472, liquid characteristics 474 (such as viscosity or specific gravity characteristics, etc.), desired application data 476 (such as desired amounts, where to apply relative to plant location, etc.), and it can include other data 478. Regardless of where they are located, they can be accessed directly by machines 100, 180, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 500, or portions of it, can be disposed on a wide variety of different devices.

Some of those devices include servers, desktop computers, laptop computers, tablet computers, or other mobile devices, such as palm top computers, cell phones, smart phones, multimedia players, personal digital assistants, etc.

Figure 9:
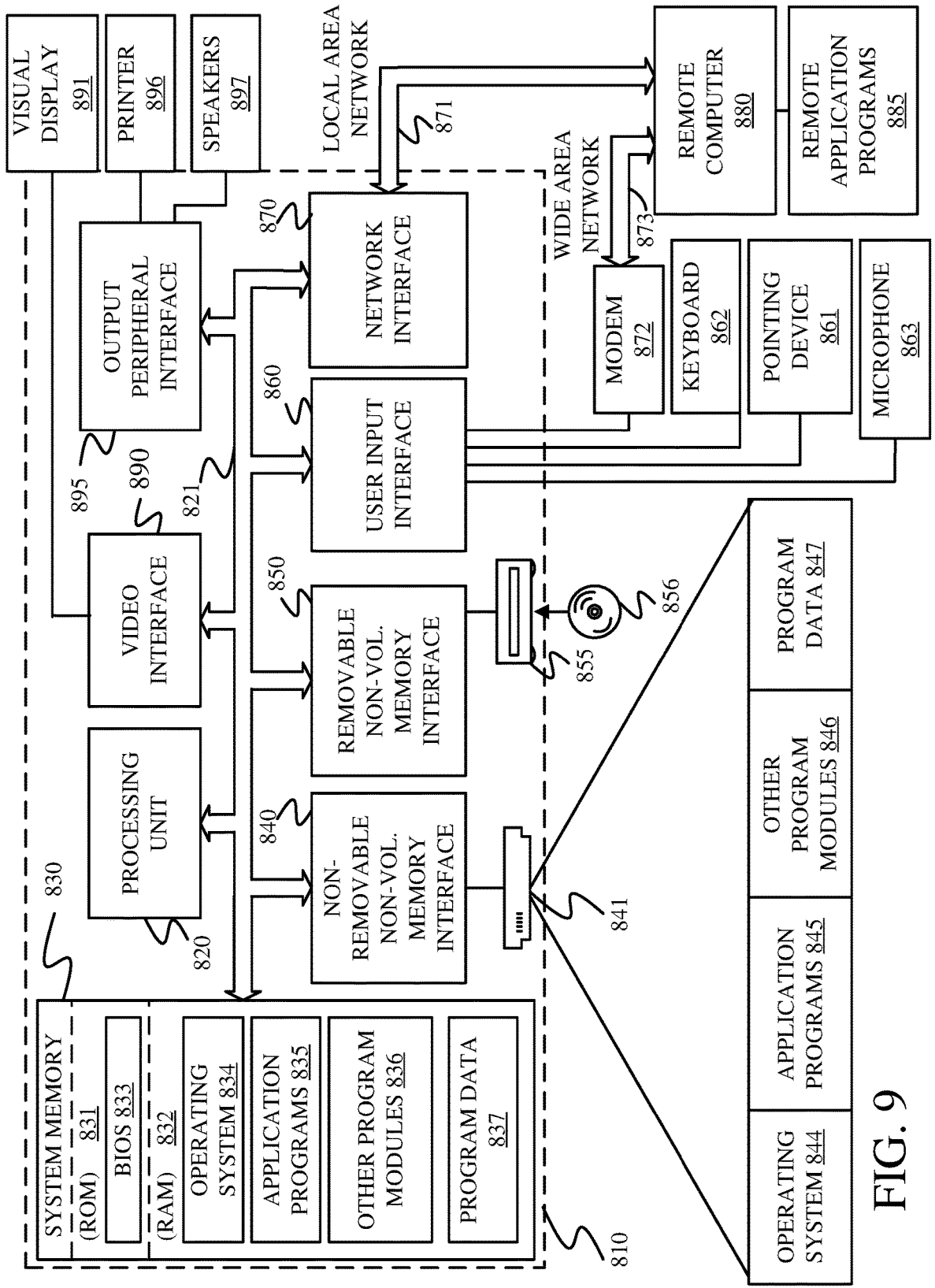
FIG. 9 is a block diagram showing one example of a computing environment that can be used in the architectures shown in the previous FIGS.

FIG. 9 is one example of a computing environment in which architecture 100, or parts of it, (for example) can be deployed. With reference to FIG. 9, an example system for implementing some examples includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 5 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks such as a controller area network (CAN) or others. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used. It should also be noted that the different embodiments described herein can be combined in different ways. That is, parts of one or more embodiments can be combined with parts of one or more other embodiments. All of this is contemplated herein.

Example 1 is an agricultural machine, comprising:
a liquid reservoir that stores liquid to be applied to a field over which the agricultural machine is traveling;
a supply line that defines a supply conduit;
a plurality of valves disposed along the supply line, each valve having an inlet end and an outlet end and being controlled to move between an open position and a closed position by a pulsed control signal;
a pump system that pumps the liquid from the liquid reservoir along the supply line to the inlet ends of the valves;
a plurality of nozzles, at least one nozzle corresponding to each valve so that when the corresponding valve is open, the liquid flows through the valve to the corresponding nozzle;
a plurality of row pressure sensors each sensing pressure at the outlet end of one of the plurality of valves and generating a corresponding row pressure signal indicative of the sensed pressure;
pulse characteristic sensing logic that receives the row pressure signal from each row pressure sensor and identifies a pulse characteristic indicative of a liquid pulse provided by the corresponding valve in the open position and generates a valve pulse characteristic signal indicative of the pulse characteristic; and
a pulsed valve control signal generator that generates the pulsed control signal based on the valve pulse characteristic signal.

Example 2 is the agricultural machine of any or all previous examples and further comprising:
time delay logic configured to receive the pulsed control signal and the valve pulse characteristic signal and identify an open time delay between the pulsed control signal generating a valve open signal controlling the valve to open and the valve pulse characteristic signal indicating that the valve is in the open position.

Example 3 is the agricultural machine of any or all previous examples wherein the time delay logic is configured to receive the pulsed control signal and the valve pulse characteristic signal and identify a close time delay between the pulsed control signal generating a valve close signal controlling the valve to close and the valve pulse characteristic signal indicating that the valve is in the closed position.

Example 4 is the agricultural machine of any or all previous examples and further comprising:
seed/chemical correlation logic configured to identify plant location in the field and control timing of the pulsed control signal based on the identified plant location.

Example 5 is the agricultural machine of any or all previous examples wherein the seed/chemical correlation logic comprises:
a valve control signal generator configured to generate a pulse control signal to control a timing characteristic of the pulsed control signal based on the plant locations in the field over which the agricultural machine is traveling, the open time delay and the close time delay.

Example 6 is the agricultural machine of any or all previous examples wherein the seed/chemical correlation logic comprises:
a pulse frequency controller configured to generate a pulse frequency control signal to control a frequency of the pulsed control signal based on the plant locations in the field over which the agricultural machine is traveling, the open time delay and the close time delay.

Example 7 is the agricultural machine of any or all previous examples wherein the seed/chemical correlation logic comprises:
a pulse duration controller configured to generate a pulse duration control signal to control a pulse duration of the pulsed control signal based on the plant locations in the field over which the agricultural machine is traveling, the open time delay and the close time delay.

Example 8 is the agricultural machine of any or all previous examples wherein the seed/chemical correlation logic is configured to correlate the pulsed control signal with the plant locations to apply the liquid material between the plant locations.

Example 9 is the agricultural machine of any or all previous examples wherein the seed/chemical correlation logic is configured to synchronize the pulsed control signal with the plant locations to apply the liquid material at the plant locations.

Example 10 is the agricultural machine of any or all previous examples and further comprising:
valve row flowrate identifier logic configured to identify a valve row flowrate for each valve based on a valve orifice size and the row pressure signal from the corresponding row pressure sensor.

Example 11 is the agricultural machine any or all previous examples wherein the seed/chemical correlation logic is configured to synchronize the pulsed control signal with the plant locations to apply a desired amount of the liquid material based on the valve flow rate.

Example 12 is the agricultural machine of any or all previous examples wherein the seed/chemical correlation logic is configured to generate a pump control signal to control liquid pressure based on a travel speed of the agricultural machine to apply a desired amount of the liquid material.

Example 13 is the agricultural machine of any or all previous examples and further comprising:
a supply line pressure sensor configured to identify pressure in the supply conduit and generate a supply line pressure signal indicative of the sensed pressure in the supply conduit; and
row pressure identifying logic configured to identify a pressure drop across a given valve based on the row pressure signal and the supply line pressure signal.

Example 14 is the agricultural machine of any or all previous examples wherein the supply line pressure sensor comprises:

a plurality of supply line pressure sensors, the row pressure identifying logic identifying the pressure drop across the given valve based on the row pressure sensor signal and a supply line pressure signal generated from a closest one of the supply line pressure sensors to the row pressure sensor.

Example 15 is the agricultural machine of any or all previous examples and further comprising:

a valve blockage detector configured to identify a valve blockage condition for the given valve based on the pressure drop across the given valve.

Example 16 is the agricultural machine of any or all previous examples and further comprising:

a seed sensor configured to sense seed presence during a planting operation and generate a seed signal indicative of the sensed seed presence.

Example 17 is the agricultural machine of any or all previous examples wherein the seed/chemical correlation logic comprises:

a seed location identifier configured to identify the plant location in the field based on the seed signal.

Example 18 is the agricultural machine of any or all previous examples wherein the seed/chemical correlation logic comprises:

a seed pattern identifier configured to identify a seeding pattern indicative of the plant location based on the seed signal.

Example 19 is an agricultural machine, comprising:

a liquid reservoir that stores liquid to be applied to a field over which the agricultural machine is traveling;

a supply line that defines a supply conduit;

a plurality of valves disposed along the supply line, each valve having an inlet end and an outlet end and being controlled to move between an open position and a closed position by a pulsed control signal;

a pump system that pumps the liquid from the liquid reservoir along the supply line to the inlet ends of the valves;

a plurality of nozzles, at least one nozzle corresponding to each valve so that when the corresponding valve is open, the liquid flows through the valve to the corresponding nozzle;

a plurality of row pressure sensors each sensing pressure at the outlet end of one of the plurality of valves and generating a corresponding row pressure signal indicative of the sensed pressure;

seed/chemical correlation logic configured to identify plant locations in the field and correlate the pulsed control signal with the plant locations to apply a desired amount of the liquid material based on the row pressure signals and the plant locations.

Example 20 is a method of controlling an agricultural machine, comprising:

pumping liquid from a liquid reservoir along a supply line, that forms a supply conduit, to inlet ends of a plurality of valves disposed along the supply line;

controlling the plurality of valves to move between an open position, in which the valves provide the liquid to a corresponding nozzle, and a closed position using a pulsed control signal, to apply the liquid to a field over which the agricultural machine is traveling;

sensing pressure at the outlet end of each of the plurality of valves;

generating a corresponding row pressure signal indicative of the sensed pressure;

identifying a pulse characteristic indicative of a characteristic of a liquid pulse generated by the corresponding valve being in the open position, based on the row pressure signal;

generating a valve pulse characteristic signal indicative of the pulse characteristic; and generating the pulsed control signal based on the valve pulse characteristic signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine, comprising:

a liquid reservoir that stores liquid to be applied to a field over which the agricultural machine is traveling;

a supply line that defines a supply conduit;

a plurality of valves disposed along the supply line, each valve having an inlet end and an outlet end and being controlled to pulse between an open position and a closed position by a pulsed control signal;

a pump system that pumps the liquid from the liquid reservoir along the supply line to the inlet ends of the plurality of valves;

a plurality of nozzles, at least one nozzle corresponding to each valve so that when the corresponding valve is open, the liquid flows through the valve to the corresponding nozzle;

a plurality of row pressure sensors each sensing pressure at the outlet end of one of the plurality of valves and generating a corresponding row pressure signal indicative of the sensed pressure;

pulse characteristic sensing logic that receives the row pressure signal from each row pressure sensor and identifies a pulse characteristic indicative of a liquid pulse provided by the corresponding valve in the open position, based on the row pressure signal, and generates a valve pulse characteristic signal indicative of the pulse characteristic;

a pulsed valve control signal generator that generates the pulsed control signal based on the valve pulse characteristic signal;

time delay logic configured to:
  receive the pulsed control signal and the valve pulse characteristic signal;
  identify an open time delay between the pulsed control signal generating a valve open signal controlling the valve to open and the valve pulse characteristic signal indicating that the valve is in the open position; and
  identify a close time delay between the pulsed control signal generating a valve close signal controlling the valve to close and the valve pulse characteristic signal indicating that the valve is in the closed position; and seed/chemical correlation logic configured to identify plant locations in die field and control timing of the pulsed control signal based on the identified plant locations, the seed/chemical correlation logic comprising:

a pulse frequency controller configured to generate a pulse frequency control signal to control a frequency of the pulsed control signal based on the plant locations in the field the open time delay and the close time delay.

2. The agricultural machine of claim 1 wherein the seed/chemical correlation logic comprises:
   a pulse duration controller configured to generate a pulse duration control signal to control a pulse duration of the pulsed control signal based on the plant locations in the field over which the agricultural machine is traveling, the open time delay and the close time delay.

3. The agricultural machine of claim 1 wherein the seed/chemical correlation logic comprises:
   a valve control signal generator configured to generate a pulse control signal to control a timing characteristic of the pulsed control signal based on the plant locations in the field over which the agricultural machine is traveling, the open time delay and the close time delay.

4. The agricultural machine of claim 3 wherein the seed/chemical correlation logic is configured to synchronize the pulsed control signal with the plant locations to apply the liquid at the plant locations.

5. The agriculture machine of claim 4 and further comprising:
   valve row flowrate identifier logic configured to identity a valve row flowrate for each valve based on a valve orifice size and the row pressure signal from the corresponding row pressure sensor.

6. The agricultural machine of claim 5 wherein the seed/chemical correlation logic is configured to synchronize the pulsed control signal with the plant locations to apply a desired amount of liquid based on the valve row flowrate.

7. The agricultural machine of claim 5 wherein the seed/chemical correlation logic is configured to generate a pump control signal to control liquid pressure based on a travel speed of the agricultural machine to apply a desired amount of the liquid.

8. The agricultural machine of claim 1 and further comprising:
   a supply line pressure sensor configured to identify pressure in the supply conduit and generate a supply line pressure signal indicative of the sensed pressure in the supply conduit; and
   row pressure identifying logic configured to identify a pressure drop across a given valve based on the row pressure signal and the supply line pressure signal.

9. The agricultural machine of claim 8 wherein the supply line press pressure sensor comprises:
   a plurality of supply line pressure sensors, the row pressure identifying logic identifying the pressure drop across the given valve based on the row pressure signal and the supply line pressure signal generated from a closest one of the supply line pressure sensors to the row pressure sensor.

10. The agricultural machine of claim 8 and further comprising:
    a valve blockage detector configured to identify a valve blockage condition for the given valve based on the pressure drop across the given valve.

11. The agricultural machine of claim 1 and further comprising:
    a seed sensor configured to sense seed presence during a planting operation and generate a seed signal indicative of the sensed seed presence.

12. The agricultural machine of claim 11 wherein the seed/chemical correlation logic comprises:
    a seed location identifier configured to identify the plain locations in the field based on the seed signal.

13. The agricultural machine of claim 11 wherein the seed/chemical correlation logic comprises:
    a seed pattern identifier configured to identify a seeding pattern indicative of the plant locations based on the seed signal.

14. The agricultural machine of claim 3 Wherein the seed/chemical correlation logic is configured to correlate the pulsed control signal with the plant locations to apply the liquid between the plant locations.

* * * * *